United States Patent [19]
Ghosh et al.

[11] Patent Number: 5,764,188
[45] Date of Patent: Jun. 9, 1998

[54] METHOD AND APPARATUS FOR LOCATION FINDING IN A WIRELESS COMMUNICATION SYSTEM

[75] Inventors: Amitava Ghosh, Fort Worth; John Dougles Reed, Arlington; Walter Joseph Rozanski, Jr., Hurst, all of Tex.; Kevin Andrew Buford, Wheaton, Ill.

[73] Assignee: Motorola, Inc., Schaumburg, Ill.

[21] Appl. No.: 842,350

[22] Filed: Apr. 24, 1997

Related U.S. Application Data

[63] Continuation of Ser. No. 601,315, Feb. 16, 1996, which is a continuation of Ser. No. 436,760, May 8, 1995, Pat. No. 5,508,708.

[51] Int. Cl.$^6$ ............................................. G01S 3/02
[52] U.S. Cl. ................................. 342/457; 455/422
[58] Field of Search ............................ 342/457; 455/422

[56] References Cited

U.S. PATENT DOCUMENTS 5,021,794  6/1991  Lawrence .
5,128,925  7/1992  Dornstetter et al. .
5,218,367  6/1993  Sheffer et al. .
5,218,716  6/1993  Comroe et al. .

Primary Examiner—Theodore M. Blum
Attorney, Agent, or Firm—Richard A. Sonnentag

[57] ABSTRACT

A method and apparatus for determining the location of a communication unit in a CDMA system includes in a first embodiment, sending a location request via a spread spectrum signal to the subscriber (140), and receiving in return a subscriber signal including a response message showing a receive time of a particular symbol of the base's spreading sequence and a transmit time of a particular symbol of the subscriber's spreading sequence. The base (130), along with other receiving base(s) (140), also receives a predetermined symbol of the subscriber spreading sequence, and each determines a respective receive time of the predetermined symbol. The received information is then processed, along with known base location and delay information, to determine the subscriber location. If insufficient number of bases are capable of communicating with the subscriber, for example due to high loading/interference, auxiliary bases (121) are also provided for receiving from or transmitting to the subscriber.

10 Claims, 7 Drawing Sheets

100

400

500

METHOD AND APPARATUS FOR LOCATION FINDING IN A WIRELESS COMMUNICATION SYSTEM

This is a continuation of application Ser. No. 08/601,315, filed on Feb. 16, 1997, which was a continuation of prior application Ser. No. 08/436,760, filed on May 8, 1995, (now U.S. Pat. No. 5,508,708), by Ghosh, et. al., for Method and Apparatus for Location Finding in a CDMA System.

FIELD OF THE INVENTION

The present invention relates, in general, to wireless communication systems and, more particularly, to a method and apparatus for locating a subscriber unit in a Code Division Multiple Access (CDMA) wireless communication system.

BACKGROUND OF THE INVENTION

In a wireless communication system it is often desirable to locate users who are making calls. Applications for such a technology would include 911-emergency services, so that police/fire/ambulance services could be dispatched to a user making a call. Other applications would include fraud detection, police investigations, and the like.

Previously installed cellular systems had little capability in this regard. For example, in AMPS (Advanced Mobile Phone System) Cellular Radio, a user could be located within a cell by determining which base station antenna was used to serve the user. However a cell could be as large as 3–5 miles in radius, making this information practically useless. Since many of the dense urban cell sites are now much smaller, and many of the urban/suburban cell sites are now sectorized, using sectored antennas to limit a channel's service area to just one sector of a cell, the coverage areas of a cell are now smaller. However, the area even in these smaller cells can still be more than one square mile. This still makes locating a user impractical for most purposes. Other radio systems, like US Digital Cellular (USDC) and Group Speciale Mobile (GSM) use the same method of identifying the cell or sector, and thus could do no better than the AMPS system.

While there are other location alternatives, such as the use of Global Positioning System (GPS) units at the subscriber unit, or triangulation onto a transmitting subscriber unit, these and similar approaches are too costly to be used by most subscribers, or in the case of triangulation, require other costly and time-consuming resources to be dedicated.

There remains therefore a need for an improved, cost-efficient approach for locating subscribers in a wireless communication system.

DETAILED DESCRIPTION OF THE DRAWINGS

Figure 1:
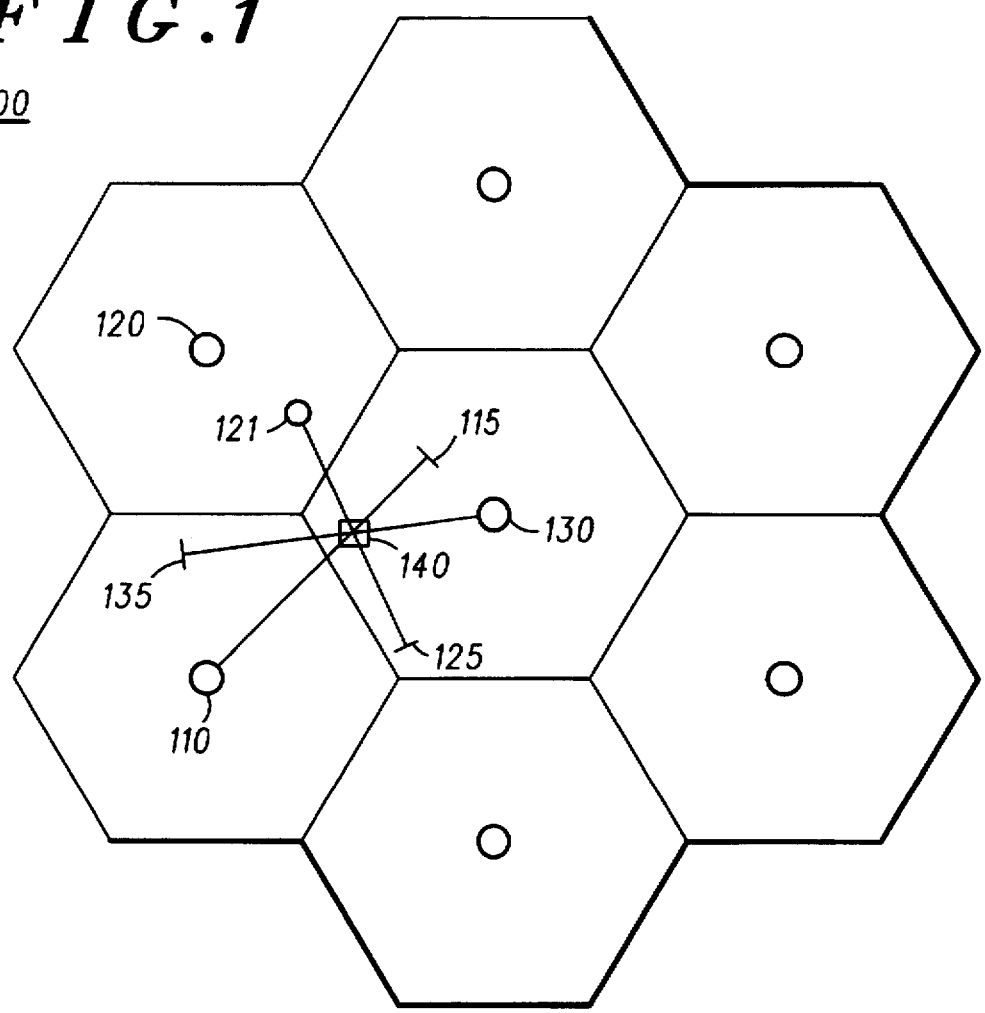
FIG. 1 is a simplified diagram illustrating a cellular system which may employ the present invention.

These problems and others are solved by an improved method and apparatus according to the invention. A presently preferred embodiment of the invention is a system for determining the location of a user in a Code Division Multiple Access (CDMA) cellular system. Using the CDMA modulation information, an estimate of the time of flight or propagation is made of the first arriving ray at a subscriber unit. The first ray received typically represents the shortest path between the base and subscriber, and the time of flight estimate allows the calculation of the distance between the subscriber and the base station. By calculating the distance to multiple, e.g., three, sites, a specific subscriber location can be calculated limited by the accuracies of the measurement timing and other processing delays.

In the preferred embodiment the time of flight of the signal between each base and subscriber is calculated automatically within a correlation receiver. The processing steps involve the transmission of a Pseudo Noise (PN) sequence coded signal time-aligned to under a chip accuracy (e.g., $\frac{1}{16}$th of a chip), and correlating on this signal at the receiver using a correlation algorithm. Because the modulation sequence (e.g., a PN sequence) is known and used in synchronization/despreading, a precise time of reception of a given chip can be determined. By determining reception time for multiple related signals, a time delay can be calculated and used to determine a position estimate.

In one implementation, the subscriber uses known PN sequence and offset information to determine which related PN chips from different bases (standard and/or auxiliary bases) that were transmitted at the same time, and also determines the time of reception of these related chips. From the difference between the reception times, a time differential and thus distance differential is determined. Using the distance differentials and known positions of the bases, a position estimate is determined. Where a subscriber is only in communication with one or two bases, additional bases may be forced into an active set (including auxiliary sites, if needed) so that time measurements can be made by the subscriber.

In another implementation, receiving base sites are controlled to make time measurements of selected chips, and the difference in receive time is used to similarly calculate the subscriber position. Where additional receive sites are needed because of interference and the like, auxiliary sites are controlled so as to receive the signals transmitted from the subscriber unit. If necessary, in case of an emergency, the subscriber unit is powered up to a maximum power level such that at least three base stations can receive and make a time estimate of the signal. Further, where more precise measurements are needed, a special location message can be transmitted to the subscriber. Upon receipt, the subscriber determines a chip/time offset for a response signal, encodes the offset and transmits the response signal. Upon decoding the offset and comparing the receive times of a same chip (e.g., the first chip of a frame) used in determining the offset, a delay compensated time value is determined for the various propagation paths, and the position determined therefrom. Finally, since it might be difficult to get a received signal at bases further away, an emergency load shedding can be performed at the nearby bases-to provide extra range, since capacity can be traded off for range in a CDMA radio system. Thus coverage is improved, and location finding is made more reliably.

Turning now to FIG. 1, a cellular system is generally depicted as 100 having a hexagonal cell pattern with base stations 110, 120, 130, and a subscriber 140. Auxiliary base units 121 are also located between bases 110, 120 and 130. The distance between bases 110, 121 and 130 and the subscriber unit 140 is estimated by determining the time of flight or propagation of the first arriving ray which is measured from a predefined reference time to the point in time that the receiver performs a correlation on the transmitted signal. This is made more difficult, in that the distance estimate may be overestimated, or underestimated since the measurement is made to an arbitrary time reference point in the receiver (a precise measurement would only be available if a more accurate (and costly) timing system such as one derived from a GPS signal or atomic clock is used in the subscriber 140). Thus, the distances 150, 160 and 170, respectively, may be longer or shorter than the actual distance between each base 110, 121, 130 and the subscriber 140 based on correlation to a chip rate (at an approximately 814 nanosecond (ns) chip rate (i.e., the rate of the fully spread signal, which is determined in TIA (Telecommunications Industry Association) Intermim Standard IS-95A by the PN sequence rate), or approximately 250 meters (m) per chip; so it is desirable to achieve time measurements at faster than the chip rate). In FIG. 1, the distance 150 is shown to be overestimated indicating a point 125 beyond the subscriber unit's actual location. Likewise points 115 and 135 are also overestimated. These points will be corrected by the distance processing described below, yielding an estimate much closer to the subscriber's true location.

Figure 2:
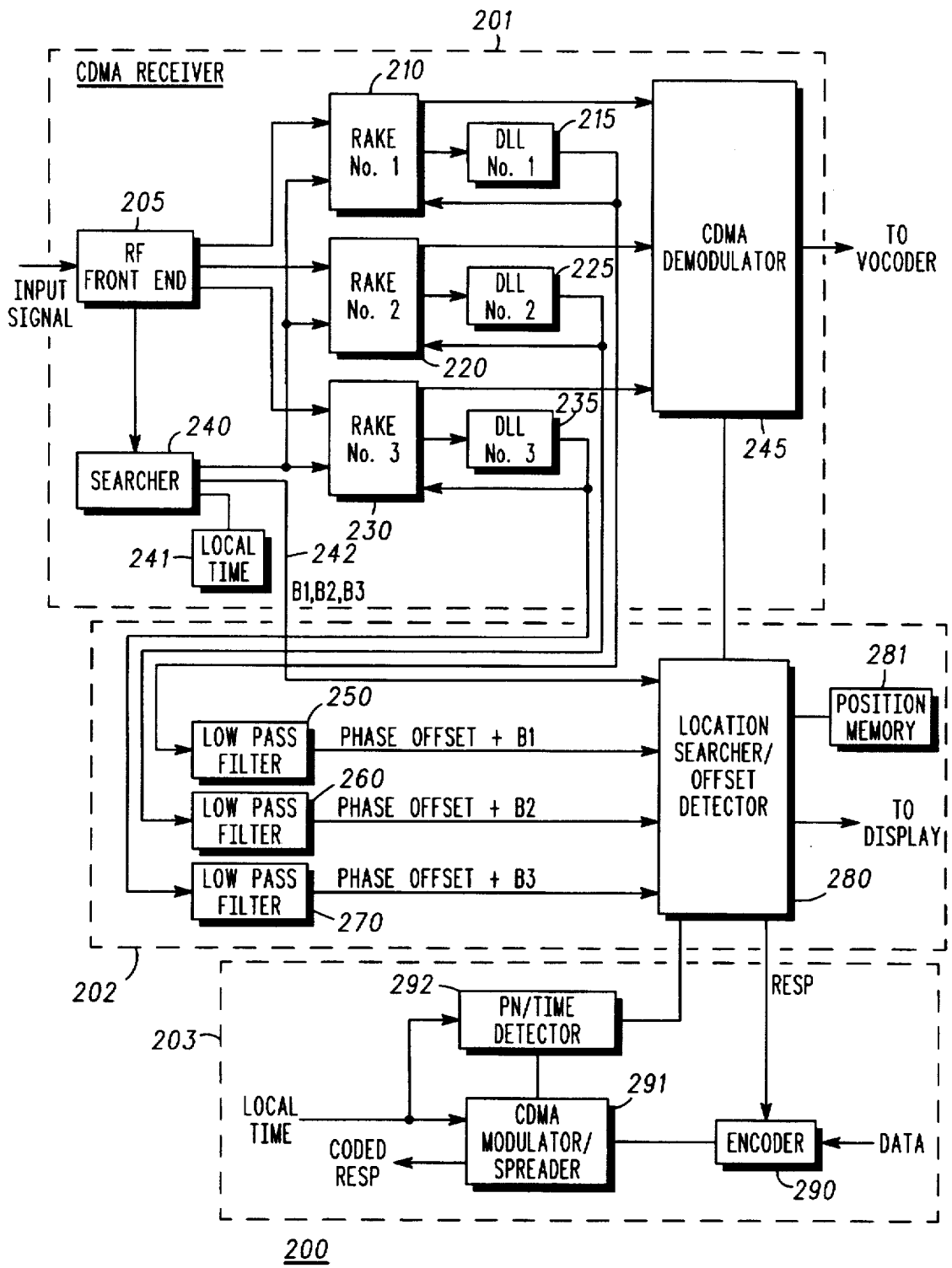
FIG. 2 is a block diagram of a CDMA receiver at a subscriber unit according to an embodiment of the invention.

FIG. 2 is a block diagram illustrating a CDMA subscriber unit 200 having a CDMA receiver 201, locator unit 202, and transmitter 203. The receiver 201 has a common RF (radio frequency) front end 205 which feeds three independent rake inputs, 210, 220, 230. These rake units 210, 220 and 230 can lock onto three different received rays that are approximately one PN chip time or more apart, which is typical of a direct sequence spread spectrum (DSSS) receiver. The searcher 240 scans for new correlation peaks at faster than the chip rate (in the preferred case allowing for resolutions as fast as the 50 ns clock rate), and can reassign the rake inputs based on its best estimate of current channel conditions. Normally, the correlators for rakes 210, 220 and 230 lock onto the three strongest rays that are available, and when a second or third base station can supply a signal sufficiently strong, they are reserved for locking onto these other base stations signals which are also delayed in time more than one PN chip time respectively, as described by the IS-95A Standard. If only two base stations are sufficiently strong, then two rays are dedicated, one for each base station, and the third ray to the strongest remaining ray for either base station.

When a location finding function is desired by the subscriber 200, it is preferable to attempt to find three different base stations, one for each ray so that sufficient information is available to accurately estimate the location. Thus, to connect to three base sites the rakes 210, 220 and 230 are adjusted so that at least three base unit signals are decoded.

If available, emergency pilot generators (such as auxiliary base unit 121 of FIG. 1) physically located between the base sites could be activated in response to a beacon request in order to blanket the area with additional reference signals, allowing the subscriber to make location estimates based on these pilot generators as well as the standard base sites. These auxiliary units would have a different PN offset than the surrounding base stations, and would typically be equipped with a GPS receiver for proper synchronization/timing. They would be coupled to the base stations or other controller in the infrastructure by any convenient means, e.g. wireless or twisted pair cable. Their activation is preferably accomplished by a request to the controller, or command from the serving base station to a local auxiliary unit under its control, upon indication by the subscriber that less than three bases are available. Alternatively, the auxiliary units could be equipped with scanning receivers that, in response to a request signal by a subscriber, would begin transmitting for a limited period (e.g., 5 seconds, in order to minimize system interference). By appropriate placement, such auxiliary units can be used to reduce uncertainties at certain locations or generally increase the accuracy of position finding in strategic areas, such as major highways, malls, or central business districts. Because of the interference-limiting nature of a CDMA system, in some cases only one base station will be able to receive the subscriber's signal, and vice-versa, so the auxiliary units are needed to obtain the necessary multiple readings.

Figure 3:
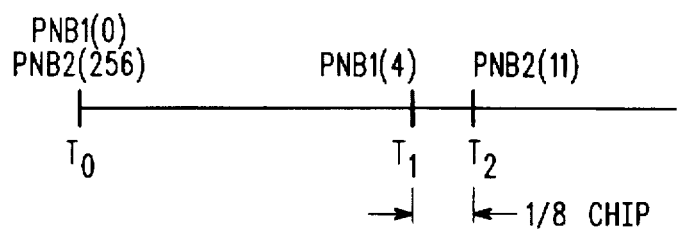
FIG. 3 is a diagram illustrating location finding of a CDMA subscriber unit according to an embodiment of the invention.

The relative time of reception of each signal is determined by using information about the leading edge (or alternately, the peaks) of related correlation peaks in the searcher, and adjusting this by an offset determined in a fine time alignment circuit (e.g., delay lock loops (DLLs) 215, 225 or 235 for each branch, coupled with filters 250–270). Preferably related correlation peaks are those received on different branches but within one chip of each other. In this approach, the precise time of the leading edge is determined, along with the PN sequence number (i.e., the chip position (e.g., number 245) of the repeating PN sequence (e.g., approximately 16,000 chips in length)). Using the already determined PN sequence offset, and the system design where the base PN sequence is the same for each base station, and transmitted at the same system time plus or minus a unique PN sequence offset, the difference in relative times yields a difference in propagation path delay. This is illustrated in FIG. 3. At time T0 two bases B1 and B2 are transmitting, but base B1 transmits PN chip 0, while base B2 transmits PN chip 256 since it has a PN sequence offset of 256 chips. At some time T1, after location finding is activated, the subscriber determines that the leading edge of PN chip 4 from B1 has been received. The next leading edge of a PN chip from base B2 is received ⅛th of a chip later at time T2, and the chip is determined to be the 280th in the PN sequence. From these receive times and PN numbers, the propagation delay difference is calculated to be ((PNB2 - offset)+(receive difference, T2−T1)) (PNB1 - offset)=((261−256)+(⅛))−(4−0)=1⅛ chips * 814 ns/chip=916 ns. At approximately 113 meter (m) per ns propagation speed for a radio signal, this translates into about 300 m difference in propagation path distances. The precision in location is only limited by the system clock rate being used and degree of synchronization. Where all base stations are using GPS timing information, synchronized transmissions (i.e., of the leading edges of chips) to within 50 ns (or approximately ¹⁄₁₆th of the chip rate) are currently possible. With a local clock generating at least the same 20 MHz clock rate, location to within 100 ns or 30 m is possible.

Figure 4:
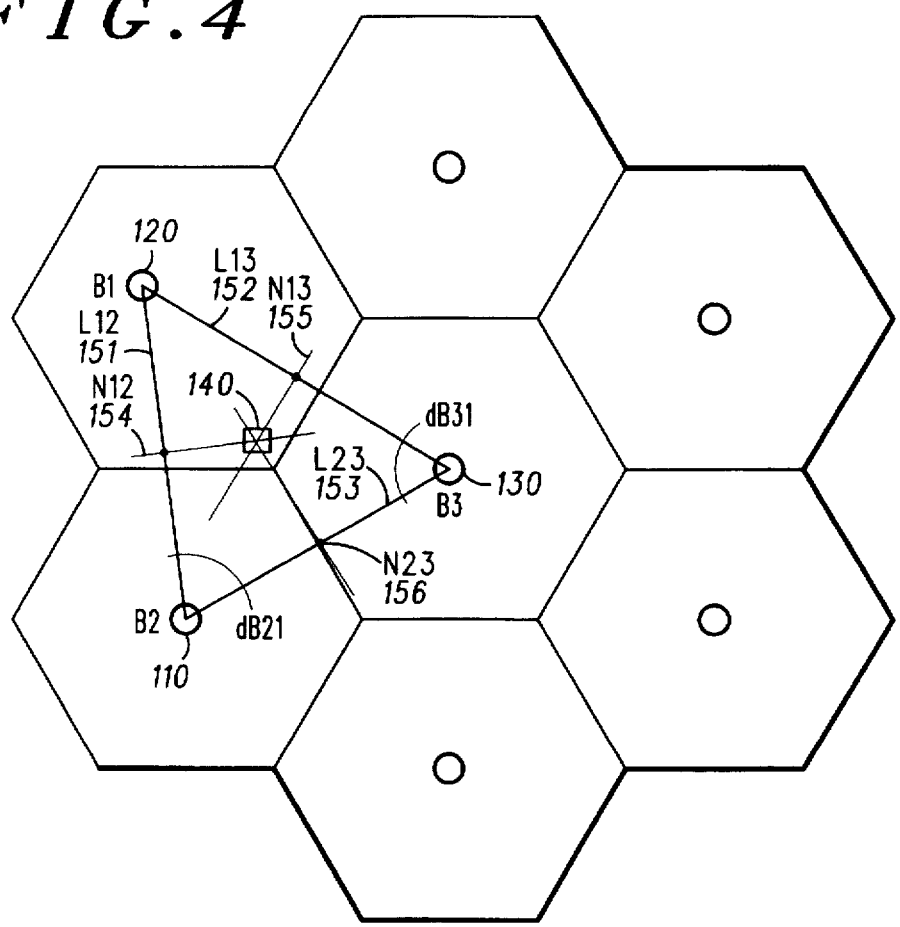
FIG. 4 is a diagram illustrating a timing sequence used in determining propagation delay for location of a CDMA subscriber unit according to an embodiment of the invention.

Returning to FIG. 2, DLLs 215, 225, and 235 are fed back to each rake 210, 220 and 230, respectively, for adjusting the signals to output fine time aligned signals. As noted above, the DLL outputs can also serve as fine phase offset information for adjusting the receive times of the PN chips, preferably after filtering in Low Pass Filters (LPFs) 250, 260, 270 for each channel, respectively, which effectively averages the outputs of each DLL 215, 225, 235. This averaged fine phase offset information, together with the chip number/times/base identification or offset (i.e. B1–B3 information) from searcher 240 (which is also adapted for PN chip/time detection), are fed to location searcher 280. Location searcher 280 takes the fine phase offset information from each branch and corrects the time of reception from searcher 240 for each chip, to give a corrected relative time of reception for each branch. From the earliest time, say B1 (i.e., the time the signal from base 1 is received), the difference tB21 and tB31 in reception time for the other signals B2 and B3 is determined, and the corresponding distances dB21 and dB31 determined. One thus knows that the distance from bases 1 (110), 2 (120) and 3 (130) are dB1, (dB1+dB21) and (dB1+dB31), respectively. Further, from the PN offsets, the identity of the bases are known and their geographic position can be retrieved from memory 281. It is then a simple matter of performing a search routine to determine, one such as illustrated in FIG. 4, to determine the geographic coordinates of the mobile. In the example of FIG. 4, the known base locations are used to define three lines L12 (151), L23 (152) and L13 (153). The distances dB21 and dB31 are subtracted from lines L12 (151), L23 (152) and L23 (152), L13 (153) respectively, and the remaining segments bisected by normal lines N12 (154), N23 (156) and N13 (155). The intersection of these lines N12 (154), N23 (156) and N13 (155) is the position of the subscriber 140. This information could then be sent to the serving base station for forwarding to a requesting party of serving location register, or could be forwarded for use by the subscriber (e.g., on a map grid or other location device, not shown).

Alternatively, if base site location information is not available to the subscriber, the phase offset, chip, timing and base offset information can be sent in a location request signal to a serving base station. There, a location searcher can access its own database and determine the subscriber location. This location information is then transmitted back in a location response message to the subscriber or other requesting entity.

Figure 5:
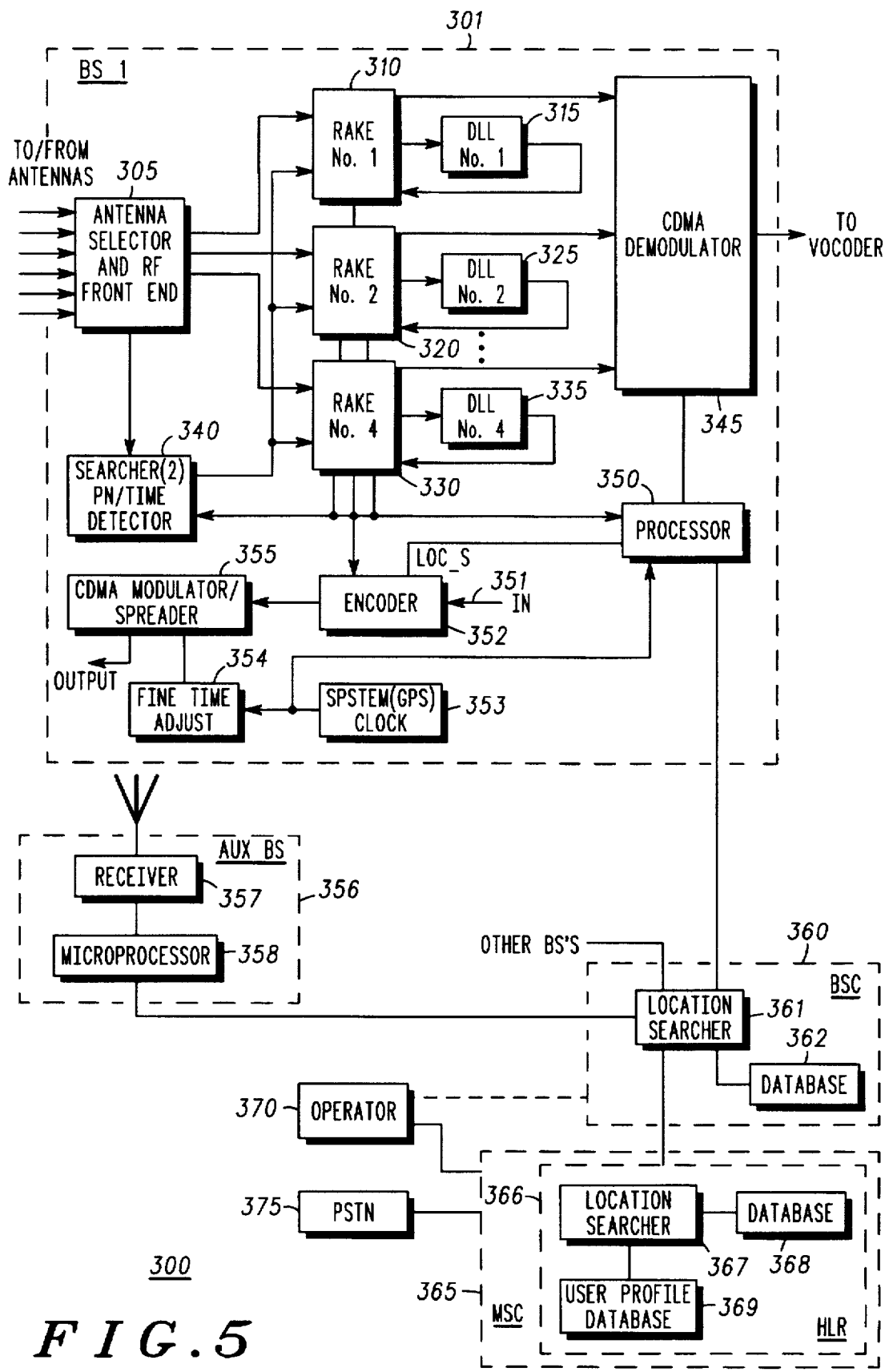
FIG. 5 is a block diagram of a CDMA receiver at a base station according to an embodiment of the invention.

A preferred approach, however, for location using infrastructure equipment can be seen with reference now to FIG. 5, which generally depicts a block diagram of a CDMA infrastructure system 300 having a first CDMA base station 301. Base 301 has a common RF front end 305 which feeds four independent rake inputs, shown as 310, 320, . . . 330. These rakes can lock onto four different received rays that are at least one PN chip time apart, which is typical of a DSSS receiver. The two searchers 340 scan for new correlation peaks, and can reassign the rakes based on its best estimate of current channel conditions. Normally, the four correlators of rakes 310, 320, 330 lock onto the four strongest rays that are available.

When a location finding function is desired, two general approaches are available-either passive (i.e., no subscriber unit response) or active. In either case it is preferable to find at least three different base stations capable of receiving a subscriber signal, so that sufficient information is available to estimate the location. In a first embodiment passive mode, four rake branches 310, 320 . . . 330 of base 301 are used to detect an uplink signal. From each rake, a Delay Lock Loop (DLL) is used to generate an estimate of the timing (i.e., adjustment) of the correlated ray. This more accurately estimates the time of the correlation, similar to the process used by the subscriber unit above. Searcher and Chip/Time Detector 340 peak correlates the signal on each branch, and also determines the best branch to use (preferably based on the earliest received peak for the same chip, but other selection techniques may be used to determine a current best branch); this best branch signal is used in determining PN chip and receive time information, similar to that in subscriber searcher 240.

To initiate a location process, in a preferred embodiment a command is initiated within the system 300, most likely at a regional entity such as a mobile switching center (MSC) 365, operations center, or perhaps within a connected network such as PSTN (public switched telephone network) 375. A location request is then processed via home location register (HLR) 366 to determine the currently serving base station(s). Upon receipt of a location command, processor 350 of base 301 (and similar processors of other serving bases) uses detector 340 to determine a chip receive time. Preferably this is accomplished by all bases determining the leading edge rise time of a specified group of PN chips, for example by determining the rise time for each 64th chip (i.e., PN sequence number 0, 64, 128, etc.) for a predetermined number of chips, e.g., 10. This information is then forwarded by each base receiver, along with its ID (identification), to a designated entity, e.g. location searcher 361 of BSC (base site controller) 360, or location searcher 367 of HLR 366, etc.. Thus, the difference in receive time for the same chips, each chip being derived from the same single chip transmission, may be used to determine propagation delay differences. In other words, for each chip number the differential between receive times at the different bases yields a propagation difference, and location may be determining this information in conjunction with the known location of the receiving bases, in a similar manner as described above with FIG. 4. By taking plural sets of information in a relatively short time frame (e.g., 10 times, every 64 chips, across about 500 microseconds), and averaging or otherwise best-fit calculating using the determined positions, position errors can be minimized. A skilled artisan will appreciate that other approaches can be used in the actual calculation. For example, a detection at the same system time(s) for leading edges within one chip of the designated time(s), along with time differences from the designated system time and chip number, could be used in determining the propagation delay differences (albeit, an additional error may arise because the transmit time for the different chips is limited by the accuracy of the subscriber's clock rate; even if a 50 ns clock cycle were present, this is still more error than present from a transmission of the same chip (which has no timing error). What is important is that the chip ID (e.g., number/ position in the PN sequence) and precise time of reception (e.g., leading edge, or peak, at the oversampled clock rate) at different bases be used in determining the subscriber location.

In a preferred embodiment for active location, a two-way ranging system is implemented using both chip receive time information and certain response information from the subscriber. In this embodiment, the process is again initiated with a location request in the system infrastructure, forwarded to base 301 which is in communication with the subscriber. Processor 350 forwards a location request signal (LOC_S 351) for appropriate encoding by encoder 352 and spreading modulator 355. Using a system clock 353

(preferably GPS derived, but other precise means such as an atomic clock may be used), fine time adjuster 354 (e.g., a strobe generator) controls the modulator 355 to precisely output the leading edge of the output chips, preferably within 50 ns accuracy. Processor 350 also determines via modulator 355 and clock 353 a precise system time for a reference chip (say, chip 1024 of a sequence of 16384 chips, at system time TS(0)), from which other chip transmission times can later be determined. The output chip sequence is then transmitted to the subscriber.

Referring once more to FIG. 2, following demodulation and receipt of the location request signal 351, processor 280 controls searcher 240 to determine ID and timing information for a next PN chip, in a similar manner as described above. For purposes of illustration, let us say the determined chip is 1088 (of the base PN sequence) at subscriber relative time TR(0). In order to provide accurate information for turn around time within the subscriber, processor 280 then determines a local time at which a predetermined chip of the subscriber PN sequence will next be transmitted. For convenience, this predetermined chip is preferably selected as one of a repeating series (say every 50th chip of the subscriber's PN sequence) yet to be transmitted (say, chip 100); almost any other chip could be selected, e.g., the first chip for the next 20 ms frame, but preferably with a view to minimizing subscriber precise-timing output requirements and system location processing. In any event, the selected chip's local time for output from modulator 291 of transmitter circuit 203 is determined, e.g., by determining a current chip's output time (e.g., via PN/Time detector 292) and calculating forward to determine the predetermined chip's output time (say, chip 100 at TR(24 1/16), relative time here being measured in chip rate intervals). Of course, if no current transmission is in progress a sufficient delay time would be given (e.g., approximately 2 seconds) for the bases to train to the subscriber's PN sequence before transmission of the predetermined chip. The processor would then forward a location response signal RESP 282 for encoding by encoder 290, and would control modulator 291 to precisely output the predetermined chip at the determined time (i.e., TR(24 1/16)), and, if a periodic group of chips is to be monitored, to precisely output any subsequent chips of the periodic group (e.g., chips 150, 200, etc.) for a predetermined period. The RESP 282 would include the base chip information (1088, TR(0)), the predetermined chip information (100, TR(24 1/16), and, if not already known by the infrastructure as part of the subscriber unit profile, a predetermined (i.e., calibrated/calculated) subscriber delay factor for pre-acquisition and post-output delays (i.e., the time it takes a signal at the antenna to reach searcher 240, and for an output signal to be radiated at the antenna following the time-precise output from modulator 291).

Returning to FIG. 5, at the same time the system controls base 301 to send the location request signal 351, it also notifies the other communicating bases to begin storing location information. Where there are less than 3 bases in communication (i.e., soft-handoff) or capable of receiving the subscriber signal, the originating entity (e.g., location searchers/processors 361 or 367) will command one or more auxiliary base stations, such as base 356, located in the vicinity of the serving bases to begin receiving at the subscriber's designated frequency. Thus, in the simplest implementation the auxiliary bases could be tunable receivers with a precise system clock (e.g., a GPS-corrected clock); if an auxiliary base was not connected via wireline to a BSC, the auxiliary base could be implemented as fixed subscriber unit (such as a wireless access fixed unit (WAFU)), the only difference from a subscriber being that the WAFU would be operating at system time (e.g., via the GPS clock). In this latter embodiment the WAFU would communicate its location response information via its own serving base station, e.g. base 301.

All receiving bases, e.g., base 301 and auxiliary base 356, begin storing subscriber chip/time information upon initiation of the location request. The stored information could be the time (e.g., leading edge receive time) and chip number for each chip received for a predetermined period. Rather than saving every chip, which in one 20 ms frame would mean close to 25,000 entries, a periodic number of chips (e.g., every 50th chip in the sequence) is preferably used by all receiving bases; in this latter case the subscriber would be configured as discussed above so as to choose a predetermined chip that is one of these periodic chips (such as chip 100). A skilled artisan will appreciate that any number of periods, or specific chips (e.g., the first chip of a frame) can be used, as long as information is being gathered on the same chip(s) at all bases in order to minimize error. Preferably, for convenience, an appropriately configured subscriber will select the predetermined chip so as to coincide with the chip(s) being monitored for by the bases, thus simplifying later calculations; the selection could be based on preprogramming, or upon data in the location request signal 351 indicating the chip(s)/period to be monitored (in which case only the predetermined chip(s) need be precisely outputted).

Figure 6:
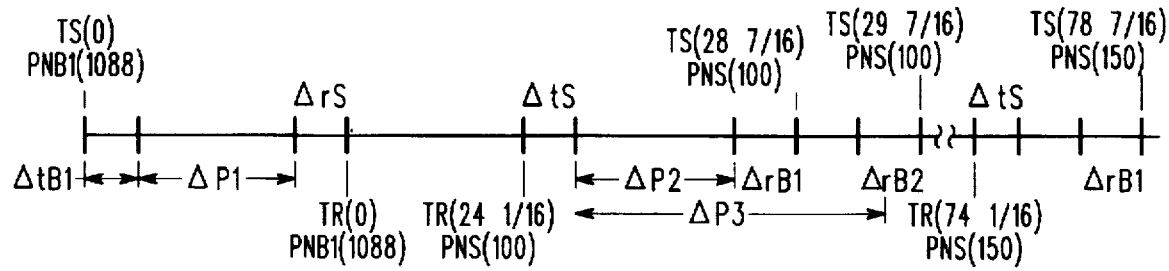
FIG. 6 is a timeline diagram illustrating propagation and delay times used in calculating a subscriber according to an embodiment of the invention.

Upon receiving the spread RESP signal from the subscriber (preferably sent via in-band signaling with any ongoing voice/data communications), processors 350 and 358 of bases 301 and 356 detect the signal and predetermined chip information, and forward some predetermined number of chip/time pairs to location searcher 361 or 367. For example, to allow for averaging to improve accuracy, each base 301, 356 may forward 8 chip/time pairs, starting with the predetermined chip and its receive time (e.g., pairs {100, TS(28 7/16)}, {150, TS(78 7/16)}, . . . {450, TS(378 8/16)}, along with the RESP signal information (e.g., the base chip/time pair {(base)1088, TR(O)}, the predetermined chip/time pair {(subscriber)100, TR(24 1/16)}, and known delay factor {4/32}). A timeline illustrating this sequence is shown in FIG. 6. TS(O) represents a starting system time, shown here as the 0th bit of the system clock for convenience, while TR(O) represents the subscriber's relative clock time. PNB1(1088) represents the 1088th chip in the first base station's (301) PN sequence, while PNS(100) represents the 100th chip in the subscriber's PN sequence. Thus, base chip 1088 is outputted at system time 0, and radiated from the base antenna a transmit delay time ΔtB1 later. After a propagation delay ΔP1 and subscriber receive delay time ΔrS (i.e., from the subscriber antenna to detector 240) later, detector 240 determines chip 1088 to be received at TR(O). Processor 280 then determines the next 50th chip of the subscriber sequence to be chip 100, and calculates from a current subscriber chip/time that the output time for chip 100 will be TR(24 1/16). Knowing the calibrated delays ΔrS and ΔtS (the delay from output to antenna radiation), say 2/32 chips each, the subscriber sends the RESP signal 282 including information, e.g., [{1088,TR(O)}, {100,TR(24 1/16), {4/32}].

Base 301 detector 240 receives subscriber chip 100 at system time TS(28 7/16) and base 357 receives it at time TS(29 7/16), with propagation and receive (i.e., antenna to detector) delays of ΔP2, ΔrB1 and ΔP3, ΔrB2, respectively. Similar repeat measurements are also performed, for example base 301 receiving chip 150 at time TS(78 7/16), the subscriber having controlled the output time of chip 150 to TR(74 1/16), i.e., precisely 50 chips (40,700 ns) later.

After a predetermined number of pairs are determined, the chip/time information and response signal information are forwarded to the location searcher 361 or 367. The searcher 361 or 367 then calculates the propagation delays, e.g., $\Delta P1-\Delta P3$, using the other known information. In this case, let the calibrated base delays $\Delta tB1$, $\Delta rB1$ and $\Delta rB2$ be 5/32, 3/32 and 3/32 chips. Because $\Delta P1$ is essentially the same as $\Delta P2$, then $$\begin{aligned}2\Delta P1 &= (TS(28\ 7/16) - TS(0)) - (\Delta tB1 + \Delta rB1) - \\ &\quad (TR(24\ 1/16) - TR(0)) - (\Delta rS + \Delta tS) \\ &= (28\ 7/16) - (8/32) - (24\ 1/16) - (4/32) \\ &= 4\text{ chips}\end{aligned} \quad \text{Eq. 1}$$

Thus, $\Delta P1$ is 2 chips, or 1628 ns, and the propagation path length is about 488 m (+/−30 m at 100 ns total uncertainty). Once $\Delta P1$ is known, $\Delta P3$ can similarly be calculated, yielding in the illustrated case a time of 3 chips and distance of 733 m. By calculating the propagation path length for at least three receivers, and retrieving the location information on the receiving bases (e.g., from databases 362 or 368) the position of the subscriber may be determined by calculating the unique point (or small region of highest probability) at which the respective propagation paths can all intersect. The process is repeated for each time/chip set. Each calculated point (or centroid of the probably region) is then used in determining the subscriber location, e.g. most simply by averaging, although any suitable process for fitting determining a most likely point/region from multiple points/regions can be used. The location of the most likely point/region is preferably stored in the user profile database 369 of HLR 366. Additionally, the entire process can be repeated after one or more further periods of time, on the order of seconds or minutes, with the plural most likely regions being used to determine a speed and direction of travel of the subscriber; if an accurate enough subscriber clock is being used so drift is under 50 ns for an extended period of multiple minutes (i.e., the subscriber clock's offset from the system time is known for that period), repeated detections at the bases could be performed without the need to repeat the request signal). Finally, the determined location, and travel speed/direction, are forwarded to the originally requesting entity, e.g. to operator 370 or via PSTN 375.

A particular advantage of using the active location process over the inactive one is that, if desired, three-dimensional information can be more accurately determined. This is particularly useful in urban or hilly areas, where the angle of incline for the propagation paths can be significantly greater than 0 degrees from the horizon. While three dimensional coordinates of the bases, and known topography of a first approximation subscriber location, can be used to increase the accuracy of the passive process, a skilled artisan will appreciate that a better approximation can be derived from the measured propagation time, as opposed to just differences in propagation times. Because the determined propagation paths are as accurate in three dimensions, it is just a matter of additional processing of the z-axis (i.e., third dimension) coordinates of the base site locations, along with their x- and y-axis coordinates, to determine the three-dimensional region of probable location. If this is compared against known building and topographical information, location to within +/−8 stories (at 100 ns uncertainty) or better in a single building is may be possible. Additional information, such as relative received signal strengths and likely path loss characteristics into a building, could be used to further narrow the region of probable location.

Figure 7:
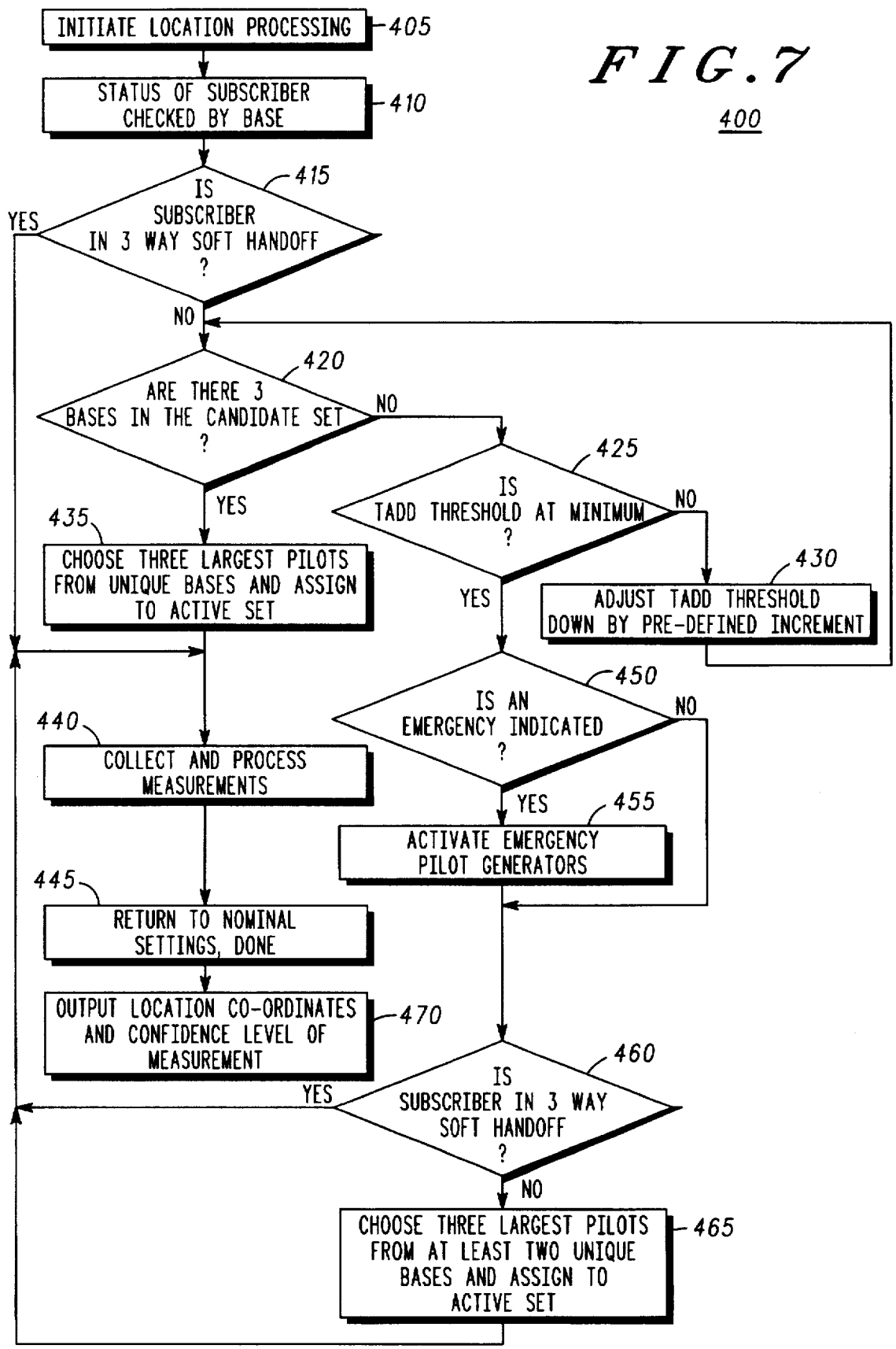
FIG. 7 is a flow chart illustrating the process by which a subscriber measures base station signals according to an embodiment of the invention.

FIG. 7, generally designated as 400, is an illustrative flow chart of the system process for a subscriber measuring base station signals to obtain a location estimate. The process is started in block 405, which represents the occurrence of a location command to be performed by the subscriber (e.g., by subscriber initiation, or automatically based on other indicator such as a motion sensor indicating a vehicle crash). Block 410 checks the status of the subscriber and a decision is made 415 based on whether or not the subscriber is in 3-way soft handoff. If it is not, block 420 is executed which tests to see if there are three bases in the candidate set. If not, decision block 425 is tested to check the threshold of adding bases to the candidate set. If this is not at the minimum, block 430 reduces the threshold and returns to process step 420. If block 425 is at a minimum level already, block 450 is executed. This block differentiates the location function between an emergency and non-emergency function. Thus, if a non-emergency function is being processed, system level changes are permitted only when the level of use is not high, since this could result in users loosing service by raising the interference level. In a non-emergency at high system loading, block 460 is executed. If an emergency is indicated, block 455 is executed before block 460. This occurs preferably in response to an emergency beacon signal to which the auxiliary pilot generators are tuned, and will automatically respond to; alternatively, an emergency signal can be sent to a serving base and processed to control the auxiliary bases to activate. In the latter case, a second non-emergency request signal could be similarly used, with an activation command being generated if the control processor (e.g., processor/searcher 361 of BSC 360 in FIG. 5) indicates system loading is beneath a loading threshold. Block 455 thus activates nearby pilot generators that provide more complete coverage of the service area by multiple sites, allowing the subscriber to receive a signal from multiple bases. Block 460 tests to see if the subscriber is in 3-way soft handoff. If not, the subscriber is instructed 465 to form a 3-way soft handoff condition using the largest rays from at least three base stations. If the result of 460 was positive, or block 465 was completed, block 440 is executed and the collection of data is made as described above in connection with FIG. 2. This data is used to process the location estimate (e.g., in searcher 280 using additional data from memory 281 of FIG. 2), and the system is returned to nominal conditions 445.

Returning to block 415, if the subscriber is in 3-way handoff, block 440 is executed. Returning to block 420, if there are three bases in the candidate set, block 435 is executed, which places three different bases in the active set. Then block 440 is executed, as described earlier, followed by block 445.

Figure 8A:
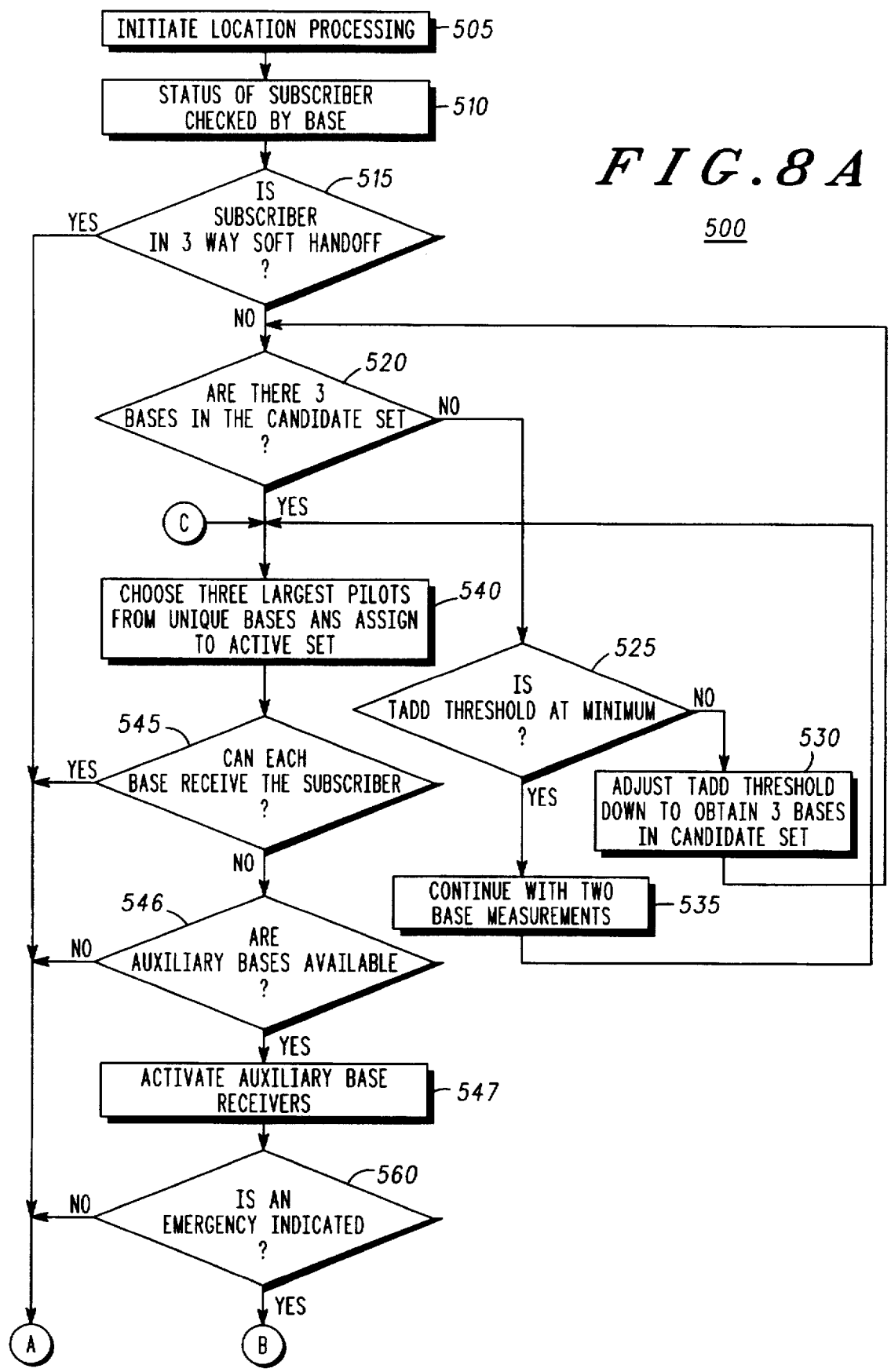
FIG. 8 is a flow chart illustrating the process by which a base station measures subscriber signals according to an embodiment of the invention.
Figure 8B:
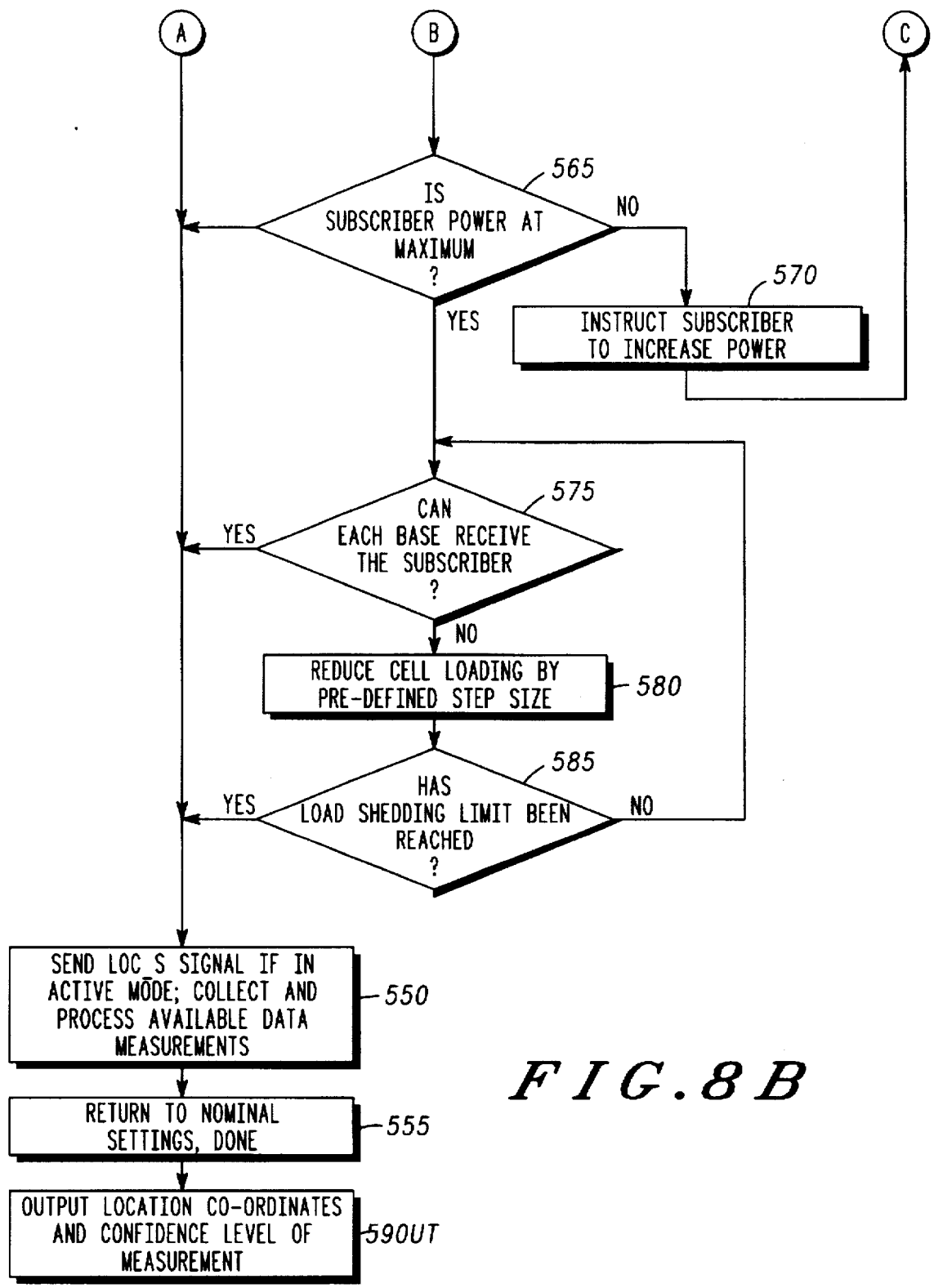

FIG. 8, generally designated as 500, is an illustrative flow chart of the process for the base stations measuring the subscriber unit to obtain a location estimate. The process starts in block 505 when the location function is activated. Block 510 checks the status of the subscriber and a decision is made 515 based on whether or not the subscriber is in 3-way soft handoff. If it is not, block 520 is optionally executed, which tests to see if there are three bases in the candidate set. If not, decision block 525 is tested to check the threshold of adding bases to the candidate set. If this is not at the minimum, block 530 reduces the threshold and returns to process step 520. If block 525 is at a minimum level already, block 535 is executed, which will continue the processing of the location estimation, but now with only two bases, which is less accurate than the desired case of having three bases in the measurements. Returning to block 515, if the subscriber is in 3-way soft handoff, or block 520 if three bases are in the candidate set, then block 540 is executed. Block 540 insures that the three base stations are active for receiving the subscriber's signal. Then block 545 is optionally executed. This block tests to see if each base can receive the subscriber. If each base can, block 550 is executed which sends a location request signal if in active mode, and in both modes collects the available data and processes the location estimate in the manner described above. Block 555 follows returning all parameters to normal and the measurements are complete. Returning to block 545, if less than three bases can receive the subscriber, block 546 tests to see if auxiliary base units are available. If so, the local auxiliary sites are activated in block 547, and block 560 tests to see if an emergency is indicated. If not, only the bases that are received can be used in the measurements, and this can degrade the quality of the estimate. If an emergency is indicated (e.g., by a subscriber signal such as the dialed digits 911, or emergency request from an authorized entity connected to the infrastructure), block 565 is executed to test if the subscriber unit is at maximum power. If not, block 570 is executed to increase the power and the process returns to block 540. If block 565 is at maximum power, block 575 tests to see if each base can receive the subscriber. If so, block 550 is executed; otherwise the cell loading is reduced by block 580 to increase the effective range of the cells in the active set that are having difficulty receiving the subscriber unit. Then block 585 tests to see if the load shedding limit has been reached, and if so, block 550 is executed; otherwise, decision block 575 is executed again to test to see if each base can now receive the subscriber.

Thus, it will be apparent to one skilled in the art that there has been provided in accordance with the invention, a method and apparatus for estimating the location of a subscriber unit of a wireless communication system that fully satisfies the objectives, aims, and advantages set forth above.

While the invention has been described in conjunction with specific embodiments thereof, it is evident that many alterations, modifications, and variations will be apparent to those skilled in the art in light of the foregoing description. For example, while the searchers 240 and 280 of the subscriber unit 200 and searcher 340 and processor 350, and other circuits, of the base station 301 are described in terms of specific logical/functional circuitry relationships, one skilled in the art will appreciate that such may be embodied in a variety of ways, such as appropriately configured and programmed processors, ASICs (application specific integrated circuits), and DSPs (digital signal processors). Further, the invention is not limited to determining location via chip information in an IS-95 CDMA system, but has applicability to any CDMA system using spreading symbol sequences. Thus, it should be understood that the invention may include in a first embodiment of active searching: a method and apparatus operable for determining the location of a subscriber unit in a CDMA wireless communication system having plural base stations, comprising: (a) sending a first spread spectrum signal including a location request from a first base station of the plural base stations to the subscriber unit, the spread spectrum signal being spread by a known first sequence of spreading symbols; (b) receiving at the first base station a second spread spectrum signal including a response message from the subscriber unit, the second spread spectrum signal being spread by a known second sequence of spreading symbols, and the response message comprising receive time of a first symbol of the first sequence and a transmit time of a first symbol of the second sequence; (c) receiving a predetermined symbol of the second sequence at the first base station and at least a second base station, and determining a first and a second receive time of the predetermined symbol at the first and second base station, respectively; and (d) determining a location of the subscriber unit from the receive time of the first symbol of the first sequence by the subscriber unit, the transmit time of the first symbol of the second sequence by the subscriber unit, the first and second receive times of the predetermined symbol, and known information about the first and at least second base stations. A further embodiment may include: a method and apparatus operable for determining a subscriber location in a CDMA communication system having plural base stations, comprising: (a) receiving a signal from the subscriber at each of a first base station, a second base station and a third base station, the signal being formed via modulation by a known sequence of spreading symbols; (b) determining a first receive time of a symbol of the known sequence of spreading symbols at the first base station, a second receive time of the symbol at the second base station, and a third receive time of the symbol at the third base station; and (c) determining the location of the subscriber unit in a location processor from the first, second and third receive times and further known information about the first, second and third base stations. In yet another embodiment there is: a subscriber unit operable for determining its own location while communicating in a CDMA wireless communication system having plural base stations, the subscriber unit comprising: (a) receiver means for receiving a first signal from a first base station of the plural base stations and a second signal from a second base station of the plural base stations, the first and second signals being formed via modulation by a known first sequence of spreading symbols and a known second sequence of spreading symbols, respectively; (b) detector means for determining a first receive time of a first symbol of the first sequence, and a second receive time of a further symbol of the second sequence; and (c) location processor means for determining the location of the subscriber unit from the first and second receive times and further known information about the first and second base stations. A yet further embodiment includes: a method for determining a location of a subscriber in a CDMA communication system having plural base units including active base stations and inactive units, comprising: (a) receiving a signal indicative of an emergency; (b) determining if at least three of the active base stations can receive a signal from the subscriber, and if not, activating at least one of the inactive units as an auxiliary base station; (c) controlling a group consisting of at least three of the active base stations which can receive a signal from the subscriber, and any auxiliary base stations activated in step (b), to each transmit a spread spectrum signal having a same symbol sequence; (d) determining each receive time at the subscriber of a same symbol of the symbol sequence for each spread spectrum signal transmitted in step (c), respectively, and sending a response from the subscriber including said each receive time; and (d) determining the location of the subscriber from said each receive time and further known information about the group.

Accordingly, it is intended that the invention not be limited by the foregoing description of embodiments, but to embrace all such alterations, modifications, and variations in accordance with the spirit and scope of the appended claims.

We claim:

1. A method of locating a communication unit in a communication system, the method comprising the steps of:

determining, at the communication unit, whether a predetermined number of reference signals transmitted from a corresponding predetermined number of base stations are capable of being decoded;

if the predetermined number of signals transmitted from a corresponding predetermined number of base stations are unable to be decoded, activating an auxiliary base station to transmit an additional reference signal; and determining the location of the communication unit based on the reference signals transmitted from base stations which are capable of being decoded and the additional reference signal transmitted by the auxiliary base station.

2. The method of claim 1, wherein the auxiliary base station is activated based on a request from the communication unit.

3. The method of claim 2, wherein the request from the communication unit is received by either a base station receiver indirectly coupled to the auxiliary base station or a scanning receiver directly coupled to the auxiliary base station.

4. The method of claim 1, wherein the auxiliary base station is activated to transmit an additional reference signal for a limited period of time.

5. The method of claim 1, wherein the additional reference signal transmitted by the auxiliary base station has a different PN offset than the base stations.

6. The method of claim 1, wherein the step of determining the location of the communication unit occurs at the communication unit and the determined location is sent to a base station serving the communication unit.

7. A method of locating a communication unit in a communication system, the method comprising the steps of:

receiving, at a plurality of base stations, a signal transmitted by the communication unit;

receiving, at an auxiliary base station located substantially between the base stations, the signal transmitted by the communication unit;

determining whether a requisite predetermined number of base stations received the signal transmitted by the communication unit;

if the requisite predetermined number of base stations did not receive the signal transmitted by the communication unit, retrieving information about the signal from the auxiliary base station; and determining the location of the communication unit based on the signal received by the base stations which did received the signal transmitted by the communication unit, the information retrieved about the signal from the auxiliary base station and information related to the location of the auxiliary base station.

8. The method of claim 7, wherein requisite predetermined number of base stations further comprises at least three base stations.

9. The method of claim 7, wherein the information retrieved about the signal from the auxiliary base station further comprises chip receive time information.

10. The method of claim 7, wherein the step of determining whether a requisite predetermined number of base stations received the signal transmitted by the communication unit is performed by a controller coupled to the base stations and the auxiliary base station.

* * * * *